United States Patent [19]

Schaberg

[11] Patent Number: 4,866,118
[45] Date of Patent: Sep. 12, 1989

[54] FLUOROCARBON ELASTOMER ARTICLES HAVING IMPROVED AMINE RESISTANCE

[75] Inventor: Mark S. Schaberg, St. Paul, Minn.

[73] Assignee: Minnesota Mining and Manufacturing Company, St. Paul, Minn.

[21] Appl. No.: 263,547

[22] Filed: Oct. 27, 1988

Related U.S. Application Data

[62] Division of Ser. No. 95,908, Sep. 14, 1987, Pat. No. 4,803,239.

[51] Int. Cl.$^4$ .............................................. C28K 3/28
[52] U.S. Cl. .................................. 524/428; 524/435; 524/436; 524/546
[58] Field of Search ............... 524/428, 435, 436, 546

[56] References Cited

U.S. PATENT DOCUMENTS

| | | | |
|---|---|---|---|
| 3,154,519 | 10/1964 | Iserson | 524/436 |
| 3,190,864 | 6/1965 | Shipp et al. | 413/436 |
| 3,306,879 | 2/1967 | Pattison | 260/77.5 |
| 3,351,619 | 11/1967 | Warnell | 260/80.76 |
| 3,745,144 | 7/1973 | Gobeil et al. | 524/428 |
| 3,824,126 | 7/1974 | Katsushima et al. | 524/435 |
| 4,035,565 | 7/1977 | Apotheker et al. | 526/249 |
| 4,131,726 | 12/1978 | Martin | 524/436 |
| 4,243,770 | 1/1981 | Tatemoto et al. | 525/331 |
| 4,251,399 | 2/1981 | Tomoda et al. | 260/4 R |
| 4,260,698 | 4/1981 | Tatemoto et al. | 525/102 |
| 4,263,414 | 4/1981 | West | 515/102 |
| 4,564,662 | 1/1986 | Albin | 526/247 |
| 4,605,695 | 8/1986 | Sakamaki et al. | 524/428 |

FOREIGN PATENT DOCUMENTS

| | | | |
|---|---|---|---|
| 0079555 | 5/1983 | European Pat. Off. | |
| 0168033 | 1/1986 | European Pat. Off. | 524/436 |
| 2166142 | 4/1986 | United Kingdom | 524/436 |

OTHER PUBLICATIONS

A. C. West & A. G. Holcomb, "Fluorinated Elastomers", Kirk Othmer, Encyclopedia of Chemical Tech., vol. 8, pp. 500–515, Table 4, 3d ed., John Wiley & Sons, 1981.

Abu-Isa et al., in Rubber Chemistry & Technology, vol. 58, pp. 326–349 (1985).

*Primary Examiner*—Joseph L. Schofer
*Assistant Examiner*—N. Sarofim
*Attorney, Agent, or Firm*—Donald M. Sell; Walter N. Kirn; William G. Ewert

[57] ABSTRACT

The amine resistance of peroxide-cured fluorocarbon elastomers is improved by dispersing certain normally solid, inorganic chloride or bromide salts in the elastomer gum formulation.

10 Claims, No Drawings

FLUOROCARBON ELASTOMER ARTICLES HAVING IMPROVED AMINE RESISTANCE

This is a division of application Ser. No. 95,908, filed Sept. 14, 1987, now U.S. Pat. No. 4,803,239.

This invention relates to compounded peroxide-curable fluorocarbon elastomer gums and cured articles made therefrom having improved resistance to amines. In another aspect, this invention relates to a method of improving the resistance of peroxide-cured fluorocarbon elastomer articles to amines.

Fluorocarbon elastomers, such as the peroxide curable type, are known for their excellent heat resistance and resistance to many chemical reagents; however, the resistance of fluorocarbon elastomers to fluids containing ammonia or amines is not sufficient for many applications (see West, A. C. and Holcomb, A. G., "Fluorinated Elastomers", Kirk-Othmer, *Encyclopedia of Chemical Technology*, Vol. 8, pp. 500–515, Table 4, 3d ed., John Wiley & Sons, 1981). Many motor oil formulations include amine-based corrosion inhibitors. These amine-based corrosion inhibitors or antiwear or antioxidant agents reduce the life of conventional fluorocarbon elastomer articles, such as hoses, gasket seals, O-ring seals, diaphragms, etc., due to chemical degradation of the fluorocarbon elastomer by the amine-based corrosion inhibitors.

The reactions leading to chemical degradation of fluorocarbon elastomer products are not well understood, although extensive work has been reported. For example, Abu-Isa et al in Rubber Chemistry and Technology, Vol. 58, p. 326–349 (1985) have shown that the extent of degradation is greater when dithiocarbamate additives are present in oil that comes into contact with the elastomer product.

Briefly, in one aspect, this invention relates to a peroxide-curable fluorocarbon elastomer gum composition comprising a peroxide-curable fluorocarbon elastomer gum with bromine or iodine atom cure sites and, dispersed in the gum, normally solid, inorganic chloride or bromide salt which imparts amine resistance to the cured elastomer article.

The additives are normally solid, metal or ammonium chloride or bromide salts. Examples of such salts are LiCl, LiBr, $CaBr_2$, $MnCl_2$, $CoCl_2$, $CoBr_2$, $NiBr_2$, $ZnCl_2$, $ZnBr_2$, $NH_4Cl$, and $NH_4Br$, including hydrates thereof. Preferred salts are non-deliquescent. While the salts can be dispersed as finely-divided solids, in general it is more effective to disperse the salts in the elastomer gum as a solution, for example as a methanol solution.

The amount of the salt used is that quantity sufficient to improve the amine resistance of the fluorocarbon elastomer article. That amount generally does not adversely affect the other chemical and physical properties of the fluorocarbon elastomer article, e.g. hydrocarbon solvent resistance and compression set resistance. In general, the amount of the salt (on an anhydrous basis) dispersed in the fluorocarbon elastomer gum is 0.25 to 5 parts, preferably 0.5 to 1.5 parts, by weight per 100 parts by weight of the fluorocarbon elastomer gum.

It is preferred to compound the inorganic salt of this invention into the fluorocarbon elastomer gum formulation and remove any solvent before adding the peroxide and co-curing agent and other ingredients.

The peroxide-curable fluorocarbon elastomer gums useful in this invention are known in the art. One class is gums which comprise interpolymerized units derived from the fluorine-containing monomers, vinylidene fluoride, hexafluoropropylene, and, optionally, tetrafluoroethylene and a bromine- or iodine-containing cure-site monomer. Another class is gums which comprise interpolymerized units derived from said fluorine-containing monomers and having terminal portions with bonded bromine or iodine atoms as cure sites. Prior art disclosures of fluoropolymers made with bromine- or iodine-containing materials include U.S. Pat. No. 3,351,619 (Warnell) which discloses use of a vinyl ether containing a fluoroalkyl iodide group; U.S. Pat. No. 3,306,879 (Pattison) which discloses the use of such compounds as 2-bromoethyl vinyl ether and 2-iodoethyl vinyl ether; U.S. Pat. Nos. 4,035,565 (Apotheker et al) and 4,263,414 (West) which disclose the use of bromine-containing olefins, such as bromotrifluoroethylene, 1-bromo-2,2-difluoroethylene, and vinyl bromide; U.S. Pat. Nos. 4,251,399 (Tomoda et al), 4,243,770 (Tatemoto et al), and 4,260,698 (Tatemoto et al) which disclose the use of iodinated compounds such as $I(CF_2CF_2)_2I$; European patent application No. 0 079 555 (Kojima et al), published May 25, 1983, which discloses the use of perfluoro(2-bromoethyl vinyl ether), and U.S. Pat. No. 4,564,662 (Albin) which discloses the use of a bromo- and an iodo-containing vinyl ether, which prior art disclosures are incorporated herein by reference for their disclosures of peroxide-curable gums useful in the practice of this invention. The curing of fluorocarbon elastomer gums with organic peroxides is likewise disclosed in said prior art disclosures, which disclosures of curing are incorporated herein by reference.

In one preferred embodiment, the fluorocarbon elastomer gums used in this invention are copolymers whose interpolymerized units comprise, consist of, or consist essentially of 45 to 85 mole percent of units derived from vinylidene fluoride, 10 to 50 mole percent of units derived from hexafluoropropylene, 0 to 30 mole percent of units derived from other highly fluorinated monomers, such as tetrafluoroethylene, and 0.15 to 1.5 mole percent of units derived from said bromine-containing or iodine-containing olefin cure site monomers.

Preferred curing agents are organic peroxides such as benzoyl peroxide, bis(2,4-dichlorobenzoyl)peroxide, dicumyl peroxide, t-butylhydroperoxide, di-t-butyl peroxide, t-butylperoxy benzoate, and lauroyl peroxide. Particularly useful commercially available peroxides are 2,5-dimethyl-2,5-bis(t-butylperoxy)hexane and 2,5-dimethyl-2,5-bis(t-butylperoxy)hexane-3 which are the active ingredients of products sold as "Luperco" 101XL and 130XL, respectively. The amount of peroxide curing agent to be mixed with the fluorocarbon elastomer gum generally will be 0.1 to 10, preferably 1 to 5, parts per 100 parts of the fluoroelastomer gum. Along with the peroxide curing agent it will generally be desirable to incorporate in, or compound with, the gum a cocuring agent (or coagent), such as is commonly used in peroxide vulcanization of fluorocarbon elastomers to obtain a tighter or faster cure or better compression set. Such cocuring agents generally will be used in amounts of 0.1 to 10, preferably 1 to 5, parts by weight per 100 parts by weight of the fluorocarbon elastomer gum. Cocuring which can be used include triallylcyanurate, diallylphthalate, allylmethacrylate and, particularly, triallylisocyanurate.

In many cases, for optimum fluorocarbon elastomer physical properties, such as tensile strength, it will be desirable to include in the compounded gum a reinforcing filler such as carbon black, silica, iron oxide, or zinc oxide, e.g. 5 to 60 parts by weight per 100 parts by weight of the fluorocarbon elastomer gums (e.g. As described in said U.S. Pat. No. 4,263,414). Conventional compounding adjuvants, such as magnesium oxide and calcium oxide as acid acceptors, pigments, plasticizers, and processing aids which are compatible with the gum, can also be added to the gum.

In making the shaped articles of this invention, generally the compounded, peroxide-curable fluorocarbon elastomer gum is extruded, and the extruded article is cured in an autoclave at about 150° C. for 30 minutes to 3 hours, or is molded in a cavity or transfer mold at a temperature in the range of 125° to 250° C. for 1 to 50 minutes or more at about 5 to 10 MPa. The extruded or molded article is then heated in a circulating-air oven and post-cured at about 170° to 260° C. for about 2 to 24 hours, preferably at about 230° C. for 16 hours, yielding a cured (that is, crosslinked or vulcanized) shaped article which is elastomeric (i.e., an article made from materials which, when cured into a test specimen and slowly stretched at room temperature to at least twice its original length and released, returns rapidly to essentially its original length).

The peroxide-curable fluorocarbon elastomer gum composition of this invention can be employed in making molded or extruded articles of manufacture, such as gasket seals, O-ring seals, diaphragms, tubing, ducting, carburetor needle valve tips, fuel pump cups, shaft seals, and other molded goods, and especially those which come into contact with amines. The particular application will usually be determined by the properties of the cured polymer, the requirements of such applications being well known and described, for example, in the prior art publications described hereinbefore.

Objects and advantages of the invention are illustrated in the following examples in which all parts, percentages and ratios are by weight unless otherwise noted.

EXAMPLES

The following examples illustrate the beneficial results of adding various inorganic chloride or bromide salts to conventional, peroxide-curable, fluorocarbon elastomer gum formulations, compounding, molding, and curing the formulated mixture, and exposing the cured article (a "dumbbell" test specimen) to amine-containing motor oil.

The formulations were prepared by banding the gum on a two-roll mill, adding the salt solution, and then adding the other ingredients as a blend. For convenience in preparing the laboratory test specimens, the salt was dissolved in twice its weight of methanol; where the salt was not sufficiently soluble in methanol, a 50:50 methanol:water medium was used.

The gum was initially banded on a two-roll, uncooled mill, and the salt solution was slowly added until uniformly mixed, the gum being cross-cut several times to yield a gum sheet with salt dispersed therein. The quantity of gum and solvent was sufficiently small that substantially all the solvent volatilized on the mill.

The gum sheet was then banded on a water-cooled mill and a blend of all remaining components was added. The compound was molded and the test samples prepared. The test specimens were press cured for 15 minutes at 7 MPa and 177° C., then post cured in a circulating air oven at 230° C. for 16 hours.

The amine-containing motor oil was prepared by dissolving, in 90 parts by weight of standard ASTM Number 1 oil, 10 parts of a mineral oil concentrate comprising a bis-succinimide, zinc dialkyl dithiophosphate, and organic amines. The concentrate, having an amine equivalent weight of about 1000, is commercially available as "HiTec 854" from Ethyl Petroleum Additives, Inc. and was used because it is regarded in the industry as a medium that normally severely degrades fluorocarbon elastomers.

Exposure of the cured test specimen was by immersion of the specimen as a dumbbell (ASTM Die D) in the amine-containing motor oil at 177° C. for 70 hours. The physical properties of the exposed specimen were measured in accordance with ASTM method D412-80.

Using the procedure described above, solutions of various salts were combined with the compounding gum formulation ("compound") set forth below in Table I.

TABLE I

| Fluorocarbon elastomer gum* | 100 parts by weight |
|---|---|
| Carbon black** | 30 |
| Ca(OH)$_2$ | 3 |
| Peroxide curatives*** | 2.5 |
| Triallylisocyanurate | 2.5 |

*The elastomer used in the examples contained units corresponding to a monomer mixture of 60 wt. % vinylidene fluoride, 39.5 wt. % hexafluoropropylene, and 0.5 wt. % 1,1-difluoro-2-bromo ethylene.
**The carbon black used is a reinforcing black supplied a "Thermax N-990" by J. M. Huber Corp.
***The peroxide curative is a 45% active preparation of 2,5-dimethyl-2-5 di(t-butylperoxy) hexane on calcium carbonate, supplied as "Luperco 101XL" by Pennwalt Corp.

Table II sets forth the composition and properties of post-cured test samples of the invention before and after exposure to the amine-containing motor oil (Examples 1–3). For comparison, Table II also sets forth the results for the compound without a salt (Example A) and for the compound with an ineffective halide salt (Example B). The weight of salt used was selected to maintain a constant 0.013 moles of halogen per hundred parts by weight of gum.

TABLE II

| Component | Examples | | | | |
|---|---|---|---|---|---|
| (parts by weight) | A | B | 1 | 2 | 3 |
| Compound (see Table I) | 138 | 138 | 138 | 138 | 138 |
| NaCl | — | 0.76 | — | — | — |
| CoCl$_2$.6H$_2$O | — | — | 1.55* | — | — |
| NH$_4$Br | — | — | — | 1.27 | — |
| ZnBr$_2$ | — | — | — | — | 1.46 |
| Post Cured Properties | | | | | |
| Tensile, MPa | 15.7 | 13.7 | 17.1 | 18.4 | 15.7 |
| Elongation, % | 229 | 219 | 252 | 213 | 228 |
| 100% Modulus, MPa | 3.53 | 3.36 | 3.43 | 4.34 | 3.63 |
| Shore A Hardness | 70 | 71 | 70 | 71 | 72 |
| Properties After Exposure of Post Cured Samples | | | | | |
| Tensile, MPa | 7.05 | 6.61 | 10.12 | 10.30 | 11.16 |
| Elongation, % | 135 | 132 | 170 | 150 | 177 |
| 100% Modulus, MPa | 4.65 | 4.50 | 4.19 | 5.02 | 4.15 |
| Shore A Hardness | 71 | 71 | 71 | 71 | 71 |

*Hydrous weight.

Although the salt concentration was not selected to provide optimum retention of properties, the data in Table II provides a useful comparison of effectiveness at a given low concentration. Both Control Example A (the standard, unmodified compound) and Comparative Example B (to which NaCl was added) lost more than half of their initial tensile strength after exposure to amine-containing motor oil. Each of Examples 1, 2 and 3 retained 60 to 70% of their initial tensile strength after exposure to these severe conditions.

Table III shows the superior amine resistance imparted to the elastomer by specific salts in contrast to the standard, salt-free compound, in Control Example C.

TABLE III

| | Examples | | | | | | | | | | | |
|---|---|---|---|---|---|---|---|---|---|---|---|---|
| Component: | C | 4 | 5 | 6 | 7 | 8 | 9 | 10 | 11 | 12 | 13 | 14 |
| Compound*, g | 138 | 138 | 138 | 138 | 138 | 138 | 138 | 138 | 138 | 138 | 138 | 138 |
| Salt: | | | | | | | | | | | | |
| type | — | LiBr | $CaBr_2$ | $MnCl_2$ | $CoBr_2$ | $NiBr_2$ | $ZnBr_2$ | $NH_4Cl$ | $NH_4Br$ | LiCl | $ZnCl_2$ | $CoCl_2 \cdot 6H_2O$ |
| amt., g | — | 1.0 | 1.0 | 1.0 | 1.0 | 1.0 | 1.0 | 1.0 | 1.0 | 1.0 | 1.0 | 1.5** |
| Post-Cured Physical Properties | | | | | | | | | | | | |
| Tensile, MPa | 15.0 | 16.9 | 14.7 | 16.0 | 14.2 | 15.4 | 15.9 | 16.2 | 16.2 | 16.1 | 14.8 | 13.1 |
| Elongation, % | 261 | 326 | 235 | 276 | 312 | 315 | 251 | 233 | 230 | 259 | 250 | 265 |
| 100% Modulus, MPa | 3.31 | 3.53 | 3.85 | 3.55 | 3.45 | 3.43 | 3.99 | 3.82 | 3.94 | 4.30 | 4.80 | 3.10 |
| Shore A Hardness | 68 | 67 | 67 | 70 | 68 | 67 | 70 | 69 | 69 | 70 | 70 | 70 |
| Properties After Exposure of Post-Cured Specimens | | | | | | | | | | | | |
| Tensile, MPa | 7.16 | 10.24 | 9.29 | 9.84 | 10.44 | 9.74 | 11.05 | 10.80 | 9.96 | 10.03 | 9.03 | 9.36 |
| Elongation, % | 159 | 200 | 164 | 187 | 216 | 202 | 187 | 170 | 161 | 175 | 171 | 192 |
| 100% Modulus, MPa | 3.95 | 3.23 | 4.74 | 3.63 | 3.07 | 2.88 | 4.13 | 4.19 | 4.53 | 4.32 | 3.87 | 3.38 |
| Shore A Hardness | 68 | 66 | 68 | 68 | 65 | 67 | 70 | 68 | 68 | 68 | 69 | 68 |

*See Table I for formulation.
**Hydrous weight.

Various modifications and alterations of this invention will become apparent to those skilled in the art without departing from the scope and spirit of this invention.

What is claimed is:

1. A method of improving the amine resistance of a fluorocarbon elastomer article comprising dispersing in a peroxide-curable fluorocarbon elastomer gum with bromine or iodine atom cure sites a normally solid, inorganic chloride or bromide salt, and forming and curing the resulting compound to produce said article, said salt imparting improved amine resistance to said article.

2. The method of claim 1 wherein said salt is non-diliquescent.

3. The method of claim 1 wherein said salt is selected from the group consisting of LiCl, LiBr, $CaBr_2$, $MnCl_2$, $CoCl_2$, $CoBr_2$, $NiBr_2$, $ZnCl_2$, $ZnBr_2$, $NH_4Cl$, $NH_4Br$, and any hydrate of said salt.

4. The method of claim 1 wherein said salt is cobalt chloride or hydrate thereof.

5. The method of claim 1 wherein 0.25 to 5 parts by weight of said salt is dispersed in every 100 parts by weight of said gum.

6. The method of claim 1 wherein said elastomer gum is a copolymer of vinylidene fluoride, hexafluoropropylene, optionally tetrafluoroethylene, and a bromine- or iodine-containing cure-site monomer.

7. The method of claim 6 wherein said cure-site monomer is 1,1-difluoro-2-bromo ethylene.

8. The method of claim 1 wherein after dispersing said salt in said gum the resulting mixture is treated to remove any solvent before adding peroxide, co-curing agent, and other ingredients.

9. The method of claim 1 wherein said elastomer article is in the form of a tube.

10. The method of claim 1 wherein said elastomer article is in the form of a seal.

* * * * *

UNITED STATES PATENT AND TRADEMARK OFFICE
CERTIFICATE OF CORRECTION

PATENT NO. : 4,866,118
DATED : September 12, 1989
INVENTOR(S) : Mark S. Schaberg It is certified that error appears in the above-identified patent and that said Letters Patent is hereby corrected as shown below:

Column 2, line 21, "patent application" should read -- Patent Application--.

Column 3, line 3, "e.g. As" should read --e.g. as--.

Column 4, line 28, "a" should read --as--. (second occurrence)

Column 5, Table III, "4.80" under "Post-Cured Physical Properties, 100% Modulus, MPa", Example 13 should read --3.80--.

Column 5, Table III, "69 68" under "Properties After Exposure of Post-Cured Specimens, Shore A Hardness", Example 13 should read --69--.

Column 5, Table III, the blank space under "Properties After Exposure of Post-Cured Specimens, Shore A Hardness", Example 14 should read --68--.

UNITED STATES PATENT AND TRADEMARK OFFICE
CERTIFICATE OF CORRECTION

PATENT NO. : 4,866,118

DATED : September 12, 1989

INVENTOR(S) : Mark S. Schaberg

It is certified that error appears in the above-identified patent and that said Letters Patent is hereby corrected as shown below:

Column 5, line 42, "non-diliquescent" should read --non-deliquescent--.

Signed and Sealed this

Twenty-ninth Day of January, 1991

Attest:

HARRY F. MANBECK, JR.

*Attesting Officer*     *Commissioner of Patents and Trademarks*